United States Patent
Mahajan et al.

(10) Patent No.: US 12,367,127 B2
(45) Date of Patent: Jul. 22, 2025

(54) DYNAMIC RESPONSE GENERATION BASED ON AN ANOMALY ASSOCIATED WITH A SOFTWARE APPLICATION

(71) Applicant: Bank of America Corporation, Charlotte, NC (US)

(72) Inventors: Nipun Mahajan, Lawrenceville, NJ (US); Pravin Kumar Sankari Bhagavathiappan, Kanyakumari District (IN); Amit Mishra, Chennai (IN); Yogesh Raghuvanshi, Princeton, NJ (US)

(73) Assignee: Bank of America Corporation, Charlotte, NC (US)

( * ) Notice: Subject to any disclaimer, the term of this patent is extended or adjusted under 35 U.S.C. 154(b) by 287 days.

(21) Appl. No.: 18/302,138

(22) Filed: Apr. 18, 2023

(65) Prior Publication Data
US 2024/0354220 A1   Oct. 24, 2024

(51) Int. Cl.
*G06F 11/3604* (2025.01)
*G06F 11/3698* (2025.01)

(52) U.S. Cl.
CPC ...... *G06F 11/3612* (2013.01); *G06F 11/3698* (2025.01)

(58) Field of Classification Search
CPC .......................... G06F 11/3612; G06F 11/3698
See application file for complete search history.

(56) References Cited

U.S. PATENT DOCUMENTS

| | | | |
|---|---|---|---|
| 7,401,145 B2 | 7/2008 | Kang et al. | |
| 7,773,611 B2 | 8/2010 | Booth, III et al. | |
| 7,974,714 B2 | 7/2011 | Hoffberg | |
| 8,296,605 B2* | 10/2012 | John | G06F 11/0793 714/48 |
| 8,468,244 B2 | 6/2013 | Redlich et al. | |
| 8,527,814 B1* | 9/2013 | Elwell | G06F 11/0793 717/124 |
| 8,745,213 B2* | 6/2014 | Dare | H04L 41/5041 709/224 |
| 8,768,731 B2 | 7/2014 | Moore | |
| 9,204,796 B2 | 12/2015 | Tran | |
| 9,213,850 B2* | 12/2015 | Barton | H04L 63/102 |
| 9,215,244 B2 | 12/2015 | Ayyagari et al. | |
| 9,569,426 B1* | 2/2017 | Bostick | H04W 4/08 |

(Continued)

OTHER PUBLICATIONS

Mahajan, Nipun, "Anomaly detection from network traffic," U.S. Appl. No. 18/302,122 filed Apr. 18, 2023 (47 pages).

*Primary Examiner* — Douglas M Slachta

(57) ABSTRACT

A system determines content indicated on a website where a software application is accessible. The system receives a set of rules comprising a first rule that indicates a first generated response is to be published on one or more first platforms. The system generates a first text response according to the first rule and based on the determined content, an anomaly associated with a software application, and a countermeasure action that addresses or resolves the anomaly. The system determines whether the first generated text response corresponds to an expected response. In response to determining that the first generated text response corresponds to the expected response, the system publishes the first generated text response on the one or more first platforms.

20 Claims, 5 Drawing Sheets

(56) References Cited

U.S. PATENT DOCUMENTS

| | | | |
|---|---|---|---|
| 9,769,306 B2* | 9/2017 | Lang | H04L 43/10 |
| 10,117,066 B2 | 10/2018 | Addepalli et al. | |
| 10,558,516 B2 | 2/2020 | Leverich et al. | |
| 10,817,586 B2* | 10/2020 | Wang | G06F 16/955 |
| 10,891,558 B2 | 1/2021 | Ben Simhon et al. | |
| 10,911,470 B2 | 2/2021 | Muddu et al. | |
| 11,113,011 B2* | 9/2021 | Kondoh | G06F 9/461 |
| 11,221,839 B2* | 1/2022 | Kulkarni | G06F 9/54 |
| 11,579,958 B2* | 2/2023 | Gonzalez Macias | G06F 11/0781 |
| 11,615,424 B2* | 3/2023 | Birsan | G06Q 10/06312 705/7.22 |
| 2017/0007148 A1 | 1/2017 | Kaditz et al. | |
| 2017/0279835 A1 | 9/2017 | Di Pietro et al. | |
| 2017/0339178 A1 | 11/2017 | Mahaffey et al. | |
| 2019/0227536 A1 | 7/2019 | Cella et al. | |
| 2020/0067969 A1 | 2/2020 | Abbaszadeh et al. | |
| 2020/0228558 A1 | 7/2020 | Apostolopoulos | |
| 2020/0342233 A1 | 10/2020 | Chang et al. | |
| 2020/0357062 A1 | 11/2020 | Belanger et al. | |
| 2020/0379454 A1 | 12/2020 | Trinh et al. | |
| 2021/0110282 A1* | 4/2021 | McCann | H04L 63/1416 |
| 2023/0213973 A1* | 7/2023 | Xu | G06F 1/1641 345/55 |

* cited by examiner

DYNAMIC RESPONSE GENERATION BASED ON AN ANOMALY ASSOCIATED WITH A SOFTWARE APPLICATION

TECHNICAL FIELD

The present disclosure relates generally to network security, and more specifically to anomaly detection from network traffic.

BACKGROUND

Organizations provide software applications as software solutions to users to perform different kinds of operations. In some cases, a software application may malfunction due to any error, such as an incomplete software update, a software bug, etc. In such cases, the users may contact the organization inquiring about the issue with the software application. If such cases are not addressed or remedied, the network resources of the organization are exhausted in response to attempting to satisfy a large volume of contacts to the organization in a short period. Furthermore, this will lead to a lot of dropped calls to the organization.

SUMMARY

The system described in the present disclosure is particularly integrated into practical applications of improving wireless communication technology, improving anomaly detection, and improving the underlying operations of computer systems affected by the detected anomaly.

The disclosed system improves wireless communication technology by reducing the incoming network traffic to an anomaly detection device. In an example scenario, assume that a software application that an organization provides to the users is malfunctioning, i.e., is associated with an anomaly, for example, due to errors in software updates, affected by an error in another software application, or any other reason. In such cases, multiple users may contact the organization, for example by sending messages, making phone calls, posting comments on a website associated with the organization, posting notifications online, e.g., on social media platforms, etc. In response, the inbound network communication buffers associated with the computing devices of the organization may be filled and overburdened causing network congestion at the computing devices of the organization. Thus, the computing devices at the organization may not be able to accept new inbound communications. Furthermore, this may lead to dropped phone calls which leads to wasting network, processing, and memory resources at the organization. In other words, this may result in excessive network traffic at the computing devices of the organization.

Certain embodiments of the disclosed system are configured to provide a solution to this and other technical problems arising in the realm of wireless communication technology. The present disclosure is configured to contemplate an unconventional system and a method to proactively detect unexpected events (e.g., anomalies) with respect to software applications, interpret, from the inbound input data, the anomaly associated with the software application, and generate and publish a custom text notification indicating that the software application is associated with the anomaly to the web, mobile, and other communication platforms. In response, the users become aware of the anomaly with respect to the software application and may not attempt to communicate with or contact the organization. Therefore, the incoming network traffic and therefore the network congestion at the computing devices associated with the organization are decreased. Thus, the number of dropped calls is reduced (or eliminated). Furthermore, the network, processing, and memory resources that otherwise would be spent to route calls of the users that eventually would drop can be utilized for other operations.

Furthermore, by proactively detecting the anomaly with respect to the software application and determining a particular countermeasure action that addresses (and resolves) the anomaly, the disclosed system improves the underlying operations of computing devices that are used to implement the software application, upstream and downstream software applications, and computer systems that may be affected by the anomaly, among others. For example, in response to determining the particular countermeasure action, the disclosed system may communicate a message to an operator to execute the determined countermeasure action. In response, the determined countermeasure action may be executed which leads to addressing and resolving the anomalous software application. In another example, in response to determining the particular countermeasure action, the disclosed system may execute the determined countermeasure action. For example, in the example discussed above, the operator may confirm, update, or revise the determined countermeasure action determined by the system. The system may use the operator feedback as a part of a training dataset to improve the accuracy in the determination of the countermeasure action for future cases. After the accuracy in the determination of the countermeasure action exceeds a threshold percentage (e.g., 90%, etc.), the disclosed system may execute the determined countermeasure action.

In this manner, the disclosed system is integrated into a practical application of improving the wireless communication technology, improving anomaly detection, and improving the underlying operations of the computer system affected by the detected anomaly.

Anomaly Detection from Network Traffic

In certain embodiments, a system for anomaly detection from network traffic includes a network interface operably coupled to a processor. The network interface is configured to receive a set of input data streams. Each of the sets of input data streams is communicated from a different data source. At least one of the set of input data streams comprises a message that indicates an anomaly with respect to a topic associated with a software application. The anomaly corresponds to an unexpected outcome when an operation is attempted with respect to the topic. The processor is configured to determine the topic, the anomaly, and a set of metadata associated with the topic from the set of input data streams. The set of metadata comprises at least one of an occurrence frequency of the anomaly with respect to the topic that is mentioned in one or more messages, a number of data sources from which the one or more messages are received, a timeframe window within which the one or more messages are received, or a number of time zones associated with the one or more messages. The processor is further configured to assign a set of weight values to the set of metadata, wherein a weight value that is assigned to a respective metadata indicates a priority for the respective metadata. The processor is further configured to determine an accumulated weight value by combining the set of weight values. The processor is further configured to determine whether the accumulated weight value is more than a threshold weight value. In response to determining that the accumulated weight value is more than the threshold weight value, the processor is further configured to determine a countermeasure action that addresses or resolves the anomalous topic. The processor is further configured to communicate an alert message that indicates to execute the countermeasure action.

Generating a Dynamic Response Based on an Anomaly Associated with a Software Application In certain embodiments, a system for generating a dynamic response based on an anomaly associated with a software application includes a memory operably coupled to a processor. The memory is configured to store a text message indicating an anomaly associated with a software application and a countermeasure action that addresses or resolves the anomaly and a training dataset that comprises an expected response labeled with the software application. The processor is configured to determine content indicated on a website where the software application is accessible, wherein the content comprises text written on the website. The processor is further configured to receive a set of rules comprising a first rule that indicates a first generated response is to be published on one or more first platforms, wherein the one or more first platforms comprises at least one of the website or a mobile application where the software application is accessed. Based at least in part upon the text message and the determined content, the processor is further configured to generate a first text response according to the first rule, wherein the first text response indicates that the anomaly associated with the software application is being addressed. The processor is further configured to determine whether the first generated text response corresponds to the expected response. The processor is further configured to publish the first generated text response on the one or more first platforms in response to determining that the first generated text response corresponds to the expected response.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions to detect an anomaly from network traffic and generate dynamic responses based on an anomaly associated with a software application. Embodiments of the present disclosure and its advantages may be understood by referring to FIGS. 1 through 5. FIGS. 1 through 5 are used to describe systems and methods that detect an anomaly from network traffic and generate dynamic responses based on an anomaly associated with a software application according to certain embodiments.

System Overview

Figure 1:
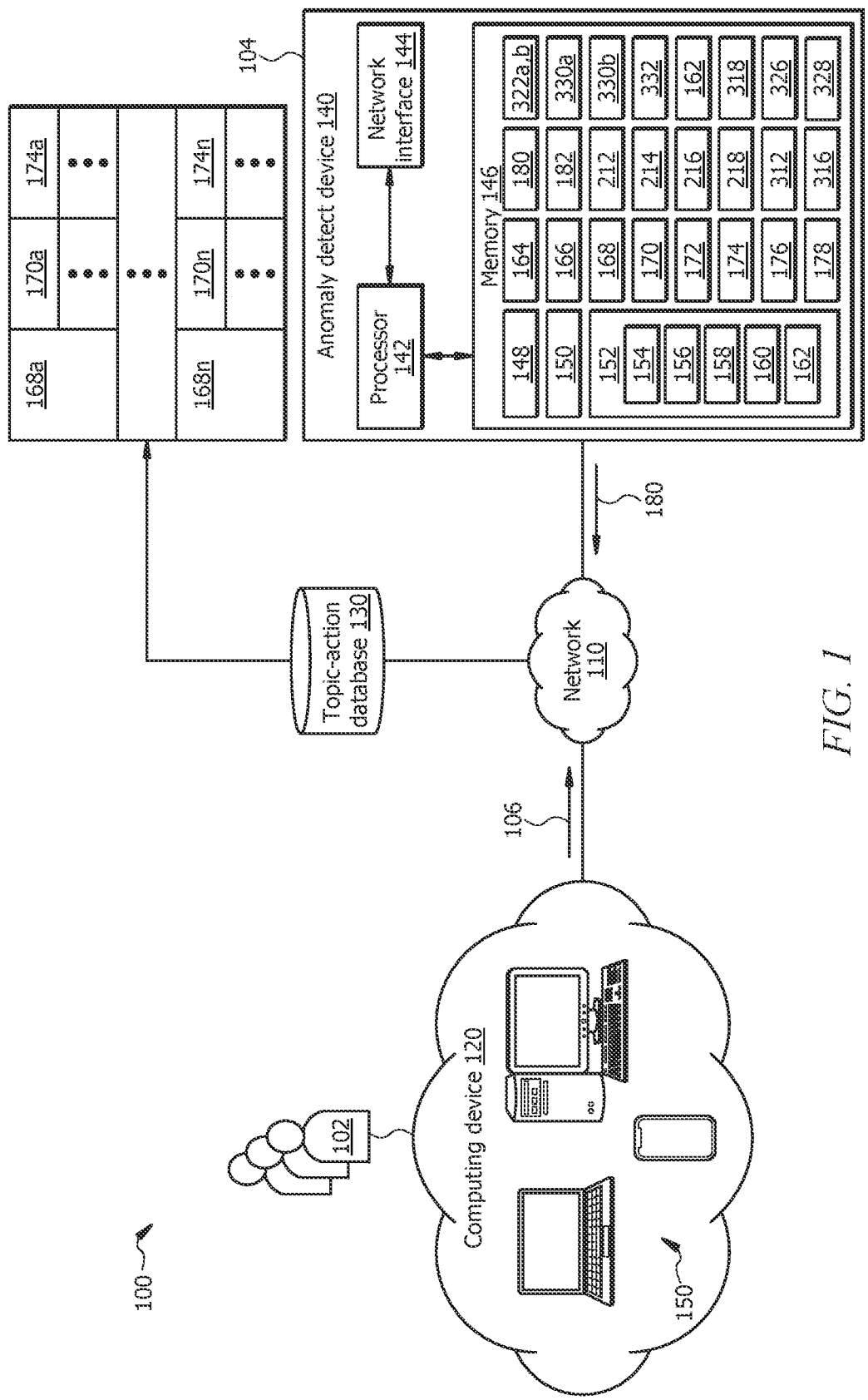
FIG. 1 illustrates an embodiment of a system configured to detect an anomaly from network traffic and generate dynamic responses based on an anomaly associated with a software application.

FIG. 1 illustrates an embodiment of a system 100 that is generally configured to i) proactively detect unexpected events (e.g., also referred to herein as an anomaly 170) with respect to a software application 150, ii) interpret what is the anomaly 170 with respect to the software application 150 based on incoming network traffic (e.g., input data 152). iii) determine a particular countermeasure action 174 that addresses (and resolves) the anomaly 170, and iv) communicate a message to execute the determined countermeasure action 174 and/or execute the determined countermeasure action 174. In certain embodiments, the system 100 comprises an anomaly detection device 140 communicatively coupled to one or more computing devices 120 and a topic-action database 130 via a network 110. Network 110 enables communications among the components of the system 100. The users 102 communicate messages 106 to the anomaly detection device 140 via the network 110. To the topic-action database 130 provides resources to be used by the anomaly detection device 140 to perform one or more of its operations. The anomaly detection device 140 includes a processor 142 in signal communication with a memory 146. The memory 146 stores the software instructions 148 that when executed by the processor 142 cause the anomaly detection device 140 to perform one or more operations described herein. In other embodiments, system 100 may not have all of the components listed and/or may have other elements instead of, or in addition to, those listed above.

In general, the system 100 improves the wireless communication technology by reducing the incoming network traffic to the anomaly detection device 140. In an example scenario, assume that a software application 150 that the organization 104 provides to the users 102 is malfunctioning, i.e., is associated with an anomaly 170, for example, due to errors in software updates, affected by an error in another software application, or any other reason. In such cases, multiple users 102 may contact the organization 104, for example by sending messages, making phone calls, posting comments on a website associated with the organization 104, posting notifications online, e.g., on social media platforms, etc. In response, the inbound network communication buffers associated with the computing devices of the organization 104 may be filled and overburdened causing network congestion at the computing devices of the organization 104 and not being able to accept new inbound communications. In other words, this may result in excessive network traffic at the computing devices of the organization 104.

Certain embodiments of the system 100 are configured to provide a solution to this and other technical problems arising in the realm of wireless communication technology. The present disclosure is configured to contemplate an unconventional system and a method to proactively detect unexpected events (e.g., anomalies 170) with respect to software applications 150, interpret, from the inbound input data 152, the anomaly 170 associated with the software application 150, and generate and publish a custom text notification 180 indicating that the software application is associated with the anomaly to the web, mobile, and other communication platforms. In response, the users 102 become aware of the anomaly 170 with respect to the software application 150 and may not attempt to communicate with or contact the organization 104. Therefore, the incoming network traffic and therefore the network congestion at the computing devices associated with the organization 104 are decreased.

Furthermore, by proactively detecting the anomaly 170 with respect to the software application 150 and determining a particular countermeasure action 174 that addresses (and resolves) the anomaly, the system 100 improves the underlying operations of computing devices that are used to implement the software application 150, upstream and downstream software applications and computer systems that may be affected by the anomaly 170, among others. For example, in response to determining the particular countermeasure action 174, the system 100 may communicate a message to an operator to execute the determined countermeasure action 174. In response, the determined countermeasure action may be executed which leads to addressing and resolving the anomalous software application 150. In another example, in response to determining the particular countermeasure action 174, the system 100 may execute the determined countermeasure action 174. For example, in the example discussed above, the operator may confirm, update, or revise the determined countermeasure action 174 determined by the system 100. The system 100 may use the operator feedback as a part of a training dataset to improve the accuracy in the determination of the countermeasure action 174 for future cases. After the accuracy in the determination of the countermeasure action 174 exceeds a threshold percentage (e.g., 90%, etc.), the system 100 may execute the determined countermeasure action 174.

In this manner, the system 100 is integrated into a practical application of improving the wireless communication technology, improving anomaly detection, and improving addressing and resolving the detected anomaly.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may be configured to support any suitable type of communication protocol as would be appreciated by one of ordinary skill in the art.

Computing Device

A computing device 120 is generally any device that is configured to process data and interact with users. Examples of the computing device 120 include but are not limited to, a personal computer, a desktop computer, a workstation, a server, a laptop, a tablet computer, a mobile phone (such as a smartphone), a virtual reality device, an augmented reality device, an Internet-of-Things (IoT) device, or any other suitable type of device. The computing device 120 may include a user interface, such as a display, a microphone, a camera, a keypad, or other appropriate terminal equipment usable by users. The computing device 120 may include a hardware processor, memory, and/or circuitry (not explicitly shown) configured to perform any of the functions or actions of the computing device 120 described herein. For example, a software application designed using software code may be stored in the memory and executed by the processor to perform the functions of the computing device 120. The computing device 120 is configured to communicate with other devices and components of the system 100 via the network 110. For example, the computing device 120 may communicate messages 106 to the anomaly detection device 140 via the network 110 in response to a command from the user, e.g., when the user initiates the transmission of the message 106. For example, the messages 106 may be in forms of emails, text messages, phone calls, online comments on the website associated with the organization 104, and posts on social media with hashtags associated with the organization 104, among others.

Topic-Action Database

Topic-action database 130 may be any storage architecture. Examples of the topic-action database 130 may include a data store, a data warehouse, a network-attached storage cloud, a storage area network, and a storage assembly directly (or indirectly) coupled to one or more components of the system 100. The topic-action database 130 may store a set of topics 168, each associated with one or more anomalies 170 and one or more countermeasure actions 174 that are configured to address and resolve the respective anomalies 170. For example, the topic 168a may be associated with the anomalies 170a and countermeasure actions 174a, and the topic 168n may be associated with the anomalies 170n and countermeasure actions 174n.

The anomaly detection device 140 may search for a particular entry in the list of topics 168a to 168n that corresponds to the same topic 168 and anomaly 170 determined from the input data 152. In response, the anomaly detection device 140 may execute the countermeasure action 174 in the determined particular entry and/or communicate a message indicating to execute the identified countermeasure action 174.

Anomaly Detection Device

Anomaly detection device 140 generally includes a hardware computer system configured to i) proactively detect the anomaly 170 with respect to a software application 150 from input data 152, ii) interpret what is the anomaly 170 with respect to the software application 150 based on incoming network traffic (e.g., input data 152), etc., iii) determine a particular countermeasure action 174 that addresses (and resolves) the anomaly 170, and iv) communicate a message to execute the determined countermeasure action 174.

In certain embodiments, the anomaly detection device 140 may be implemented by a cluster of computing devices, such as virtual machines. For example, the anomaly detection device 140 may be implemented by a plurality of computing devices using distributed computing and/or cloud computing systems in a network. In certain embodiments, the anomaly detection device 140 may be configured to provide services and resources (e.g., data and/or hardware resources, such as the notifications 180, countermeasure actions 174, etc.) to other components and devices.

The anomaly detection device 140 comprises a processor 142 operably coupled with a network interface 144 and a memory 146. Processor 142 comprises one or more processors. The processor 142 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 142 may be a programmable logic device, a microcontroller, a microprocessor, or any suitable number and combination of the preceding. The one or more processors are configured to process data and may be implemented in hardware or software. For example, the processor 142 may be 8-bit, 16-bit, 32-bit, 64-bit, or of any other suitable architecture. The processor 142 may include an arithmetic logic unit (ALU) for performing arithmetic and logic operations. The processor 142 may register the supply operands to the ALU and store the results of ALU operations. The processor 142 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 148) to perform the operations of the anomaly detection device 140 described herein. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-5. For example, the processor 142 may be configured to perform one or more operations of the operational flow 200 as described in FIG. 2, one or more operations of the operational flow 300 as described in FIG. 3, one or more operations of method 400 as described in FIG. 4, and one or more operations of method 500 as described in FIG. 5.

Network interface 144 is configured to enable wired and/or wireless communications. The network interface 144 may be configured to communicate data between the anomaly detection device 140 and other devices, systems, or domains. For example, the network interface 144 may comprise an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 142 may be configured to send and receive data using the network interface 144. The network interface 144 may be configured to use any suitable type of communication protocol.

The memory 146 may be volatile or non-volatile and may comprise read-only memory (ROM), random-access memory (RAM), ternary content-addressable memory (TCAM), dynamic random-access memory (DRAM), and static random-access memory (SRAM). The memory 146 may include one or more of a local database, a cloud database, a network-attached storage (NAS), etc. The memory 146 comprises one or more disks, tape drives, or solid-state drives, and may be used as an over-flow data storage device, to store programs when such programs are selected for execution, and to store instructions and data that are read during program execution. The memory 146 may store any of the information described in FIGS. 1-5 along with any other data, instructions, logic, rules, or code operable to implement the function(s) described herein when executed by processor 142. For example, the memory 146 may store software instructions 148, input data 152, alert message 182, pre-processor machine learning module 164, topic 168, anomaly 170, metadata 172, countermeasure action 174, weight value 176, threshold weight value 178, notifications 180, interpreter engine 166, software applications 150, text generator 310, digital content 312, rules 314*a*, *b*, sample text 316, legal text template 318, responses 322*a*, *b*, reward function 326, reward value 328, vectors 330*a*, *b*, threshold reward value 332, weight values 176, threshold weight value 178, interpretation 214, training dataset 218, features 212, 216, alert message 182, annotated topic dataset 160, word hierarchy templates 158, error log files 156, relational dataset 162, and/or any other data or instructions. The software instructions 148 may comprise any suitable set of instructions, logic, rules, or code operable to execute the processor 142 and perform the functions described herein, such as some or all of those described in FIGS. 1-5.

Input data 152 comprises the user input 154, error log files 156, word hierarchy templates 158, annotated topic database 160, and relational dataset 162. The user input 154 may include the messages 106 associated with the users 102. The users 102 may refer to a topic 168 in the messages 106 and indicate that there is an anomaly 170 associated with the topic 168 in the messages 106. Examples of the topic 168 may include the software application 150 (that is associated with the anomaly 170), software services, and hardware services that the organization 104 provides to users 102. The error log files 156 comprises error messages as a result of the anomaly 170 with respect to a topic 168 in one or more software applications that are affected by or caused the anomaly 170 with respect to the topic 168. The software application 150 may be a web, mobile, or a software application that is configured to perform a function to provide a service to the users 102 when they use the software application. For example, the software application 150 may enable data communication between users 102, between a user 102 and the organization, receive a form from a user 102, etc.

The word hierarchy templates 158 may include a set of word hierarchy templates 158. Each word hierarchy template 158 may indicate a different template hierarchy between words in a sentence. The hierarchy between the words may indicate that a particular word represents the topic 168 of the sentence (indicated in the message 106) and one or more other words in the sentence are neighboring words to the particular word. In other words, the word hierarchy templates 158 may provide information about what is the main word that represents the topic 168 of a given sentence (indicated in message 106), what are preceding and subsequent words in relation to the main word, and what is the relationship between the words in a sentence (indicated in a message 106). The output of the word hierarchy templates 158 is the identified main word, neighboring words, and their relationship in each sentence of the message 106. The output of the word hierarchy templates 158 is fed to the interpreter engine 166 for further processing.

The annotated topic dataset 160 comprises a list of topics 168, where each topic 168 is associated with respective one or more operations with respect to the topic 168. In other words, each topic 168 may be annotated with respective aspect(s), argument(s), and/or operation(s). For example, in the case that the topic 168 is a deployment of a software application, the annotations of the topic 168 may include backend deployment, execution of the deployment, frontend deployment, a third-party deployment, a question about the deployment, operations needed for the deployment, among others.

Relational dataset 162 may include a map data that indicate a map between different terminologies used in different platforms. For example, in the case where the terminology is an address, the relational dataset 162 may include a map between an address indicated in a user profile and an address indicated in a data communication for the user. In other words, the relational dataset 162 may indicate a map between different terminologies in a particular corpus related to a technology, e.g., software application deployment, etc.

Pre-processor machine learning module 164 may be implemented by the processor 142 executing software instructions 148 and is generally configured to identify words from the messages 106 (i.e., user inputs 154). In certain embodiments, the pre-processor machine learning module 164 may include a support vector machine, neural network, random forest, k-means clustering, Tree-based algorithm, Random Forest algorithm, etc. In certain embodiments, the pre-processor machine learning module 164 may include natural language processing, audio signal processing, and the like. In certain embodiments, the pre-processor machine learning module 164 may perform word segmentation, sentence segmentation, word tokenization, sentence tokenization, sentiment analysis, and/or the like in processing each message 106 to detect the words in each message 106, the location of each word in a sentence, and other information about each word in each message 106. The pre-processor machine learning module 164 provides output to the word hierarchy templates 158 and the interpreter engine 166 for further processing (see FIG. 2).

Interpreter engine 166 may be implemented by the processor 142 executing the software instructions 148, and is generally configured to interpret the meaning of each message 106 based on the input data 152, determine a countermeasure action 174 that addresses (or resolves) the anomaly 170 with respect to the software application 150. In certain embodiments, the interpreter engine 166 may include a support vector machine, neural network, random forest, k-means clustering, Tree-based algorithm, Random Forest algorithm, etc. In certain embodiments, the interpreter engine 166 may include natural language processing, audio signal processing, and the like. In certain embodiments, the interpreter engine 166 may perform text analysis, audio analysis, sentiment analysis, among other operations to determine the meaning of each message 106 and perform other functions.

The interpreter engine 166 may be implemented by an unsupervised, semi-supervised, or supervised machine learning module. For example, in the training stage, the interpreter engine 166 may be given a set of sample text messages, each labeled with a respective meaning. The interpreter engine 166 may extract a set of features from each sample text message, where the set of features may represent the words, meaning of each word, location of each word, sentiment of the message, etc. The interpreter engine 166 may learn the relationship between the extracted features and the respective label. The interpreter engine 166 may perform a similar operation for each sample text message. In a testing stage, the interpreter engine 166 may be given a testing text message that is not labeled with a respective meaning. The interpreter engine 166 may extract a set of features from the testing test massage, similar to that described above. The interpreter engine 166 may compare the extracted features from the testing text message to each of the extracted features from the labeled sample text messages. If the interpreter engine 166 identifies a matching or corresponding match, the interpreter engine 166 determines that the meaning of the testing text message is the same as the label meaning of the corresponding sample text message. The weight and bias values of neural networks of the interpreter engine 166 may be revised in backpropagation to improve the accuracy of prediction of meanings of testing text messages. An operator may provide feedback on the predictions of the interpreter engine 166. The interpreter engine 166 may use the operator feedback to further improve the accuracy of the predictions. Similar operations may be performed with respect to determining a countermeasure action 174 that addresses and resolves the anomaly 170.

Text generator 310 may be implemented by the processor 142 executing the software instructions 148, and is generally configured to generate text messages 322a, b based on the topic 168, anomaly 170, metadata 172, countermeasure action 174, legal text template 318, digital content 312, rules 314a, b, sample text 316, etc. In certain embodiments, the text generator 310 may include a support vector machine, neural network, random forest, k-means clustering, Tree-based algorithm, Random Forest algorithm, etc. In certain embodiments, the text generator 310 may include natural language processing, audio signal processing, and the like. In certain embodiments, the text generator 310 may perform text analysis, audio analysis, sentiment analysis, among other operations to generate the responses 322a, b and perform other functions.

Operational Flow for Anomaly Detection from Network Traffic

Figure 2:
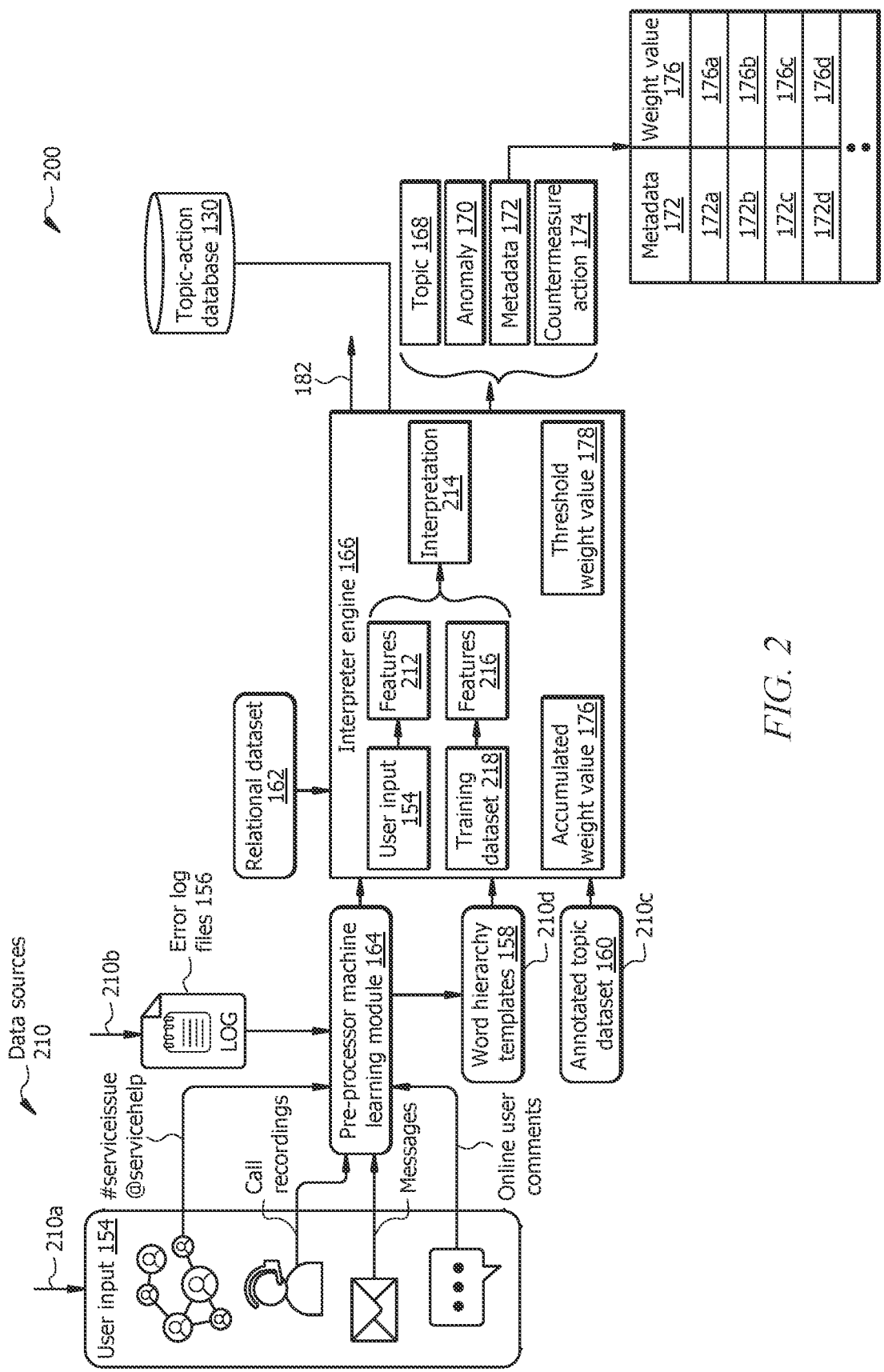
FIG. 2 illustrates an example operational flow of the system of FIG. 1 to detect anomalies from network traffic.

FIG. 2 illustrates the example operational flow 200 of the system 100 (see FIG. 1) to detect anomaly 170 associated with the software application 150 from network traffic (e.g., input data 152). The operational flow 200 begins when the users 102 provide user input 154 to the organization.

In operation, if the software application 150 malfunctions, the user 102 may not be able to use the software application 150. In response, the affected users 102 may contact the organization by providing user input 154 indicating that they cannot use the software application 150. For example, some users 102 may post on social media platforms about the anomaly 170 associated with the software application 150, some users 102 may call the organization, some users 102 may input comments on the website of the organization, and some users 102 may email or text the organization.

Determining the Anomaly Associated with a Software Application from the User Input The user input 154 may be provided to the pre-processor machine leaning module 164. The anomaly 170 may cause errors in one or more software applications operated by the computer systems at the organization. Thus, the error log files 156 may include such error messages. The error log files 156 may also be fed to the pre-processor machine learning module 164. Based on the received user input 152 and the error log files 156, the pre-processor machine learning module 164 may determine the words in each sentence in the received input, e.g., by performing word segmentation, word tokenization, etc. similar to that described in FIG. 1. The output of the pre-processor machine learning module 164 may be tokenized and segmented words indicated in the received user input 152 and the error log files 156. The pre-processor machine learning module 164 may provide the output to the interpreter engine 166 and the word hierarchy templates 158.

The word hierarchy templates 158 may determine the main word that is the topic 168 in each sentence (or user input 152) and the main word that is the topic 168 in the error log files 156, and the neighboring words for each topic 168 based on the output of the pre-processor machine learning module 164. The output of the word hierarchy template 158 may be fed to the interpreter engine 166 for further processing.

The annotated topic dataset 160 and the relational dataset 162 may also be fed to the interpreter engine 166. The interpreter engine 166 may determine the topic 168, the anomaly 170, and the metadata 172 associated with the topic 168 from the received input data streams 152. As shown in FIG. 2, each of the input data streams 152 is received from a different data source 210. The user inputs 154 may be received from computing data sources 210a associated with the user 102.

The error log files 156 may be received from computing data sources 210b that store the error log files 156 associated with different software applications. The annotated topic dataset 160 may be received from a computing data source 210c. The word hierarchy templates 158 may be received from a computing data source 210d. At least one of the input data streams 152 may comprise a message that indicates an anomaly 170 with respect to the software application 150. The anomaly 170 may correspond to an unexpected outcome when an operation is attempted with respect to the software application 150 (e.g., the topic 168 of the messages 106).

The interpreter engine 166 may determine the topic 168, the anomaly 170, and the metadata 172 associated with the topic 168 by performing text analysis, time series analysis, etc. For example, the interpreter engine 166 may feed the received inputs to a neural network and extract a set of features 212 from the inputs. The set of features 212 may represent the location of each words in a sentence, a meaning of each word, a sentiment of each word, a sentiment of each sentence, a time zone associated with each user input 154, a time zone associated with each error log file 156, and other information about each input data. The set of features 212 may be presented in a message vector comprising numerical values. Based on the information derived from the pre-processor machine learning module 164, the word hierarchy templates 158, the annotated topic dataset 160, and the relational dataset 162, the interpreter engine 166 may determine the set of features 212 from the input data.

The interpreter engine 166 may determine the interpretation 214 of the user inputs 154 based on the features 212 and other inputs, including the annotated topic dataset 160, the word hierarchy templates 158, and the relational dataset 162. For example, the interpreter engine 166 may use at least a portion of one or more of the annotated topic dataset 160, the word hierarchy templates 158, and the relational dataset 162 as a training dataset 218 for determining the interpretation 214 of the user input 154. In this process, the interpreter engine 166 may extract a set of features 216 from the training dataset 218, where the features 216 represent a structure of a sentence, a sentiment of a sentence, the meaning of a sentence, and the meaning of each word, among others. The features 216 may be represented by a training feature vector. The interpreter engine 166 learns the associations between the set of features 216 and the respective interpretations. The interpreter engine 166 may compare the features 216 with the features 212. In this operation, the interpreter engine 166 may compare the training feature vector with the message vector. If the interpreter engine 166 determines that more than a threshold number of features from the message vector corresponds to the counterpart features from among the training feature vector, the interpreter engine 166 may determine that the interpretation 214 of the user input 154 corresponds to the interpretation that the corresponding data from the training dataset 218 is labeled with.

In certain embodiments, the interpreter engine 166 may determine a Euclidean distance between the training feature vector and the message vector. If the determined Euclidean distance is less than a threshold distance, the interpreter engine 166 may determine that the interpretation 214 of the user input 154 corresponds to the interpretation that the corresponding data from the training dataset 218 is labeled with.

In some cases, the interpreter engine 166 may determine the interpretation 214 of the user inputs 152 based on combining learned information from different input data (e.g., user inputs 152, the error log files 156, relational dataset 162, annotated topic dataset 160, and word hierarchy templates 158, etc.). For example, the interpreter engine 166 may determine that a first user input 152 indicates that a software application 150 is malfunctioning but does not mention the anomaly 170, and determine that a second user input 152 indicates that there is an anomaly 170 that is associated with a function at a software platform but does not mention the software application 150. From these and the other inputs (included in the input data 152), the interpreter engine 166 may determine that the function at the software platform is associated with the software application 150 and combine the learned information and determine that the software application 150 is associated with the anomaly 170.

In response to determining the interpretation 214 of the user input 154, and processing other input data 152, the interpreter engine 166 may determine the topic 168 of the user inputs 152, the anomaly 170 associated with the software application 150 (that is the topic of the user inputs 152), and the metadata 172 associated with the software application 150. The metadata 172 may include the occurrence frequency of the anomaly 170 with respect to the topic 168 that is discussed or mentioned in one or more messages 106, a number of data sources 210 from which one or more messages 106 (where the anomaly 170 and/or the software application 150 is mentioned) are received, a timeframe window within which the one or more messages 106 (where the anomaly 170 and/or the software application 150 is mentioned) are received, and a number of time zones associated with the one or more messages 106 (where the anomaly 170 and/or the software application 150 is mentioned), among others.

Determining a Priority of the Anomalous Software Application

The interpreter engine 166 may determine a priority of the anomalous software application 150 indicating the urgency in addressing and resolving the anomalous software application 150. In this process, the interpreter engine 166 may assign a set of weight values 176 to the set of metadata 172, where each metadata 172 is assigned with a respective weight value 176. The weight value 176 assigned to a respective metadata 172 indicates a priority for the respective metadata 172. For example, the interpreter engine 166 may assign a first weight value 176a to the occurrence frequency 172a of the anomaly 170, where the first weight value 176a is proportional to the occurrence frequency 172a of the anomaly 170 such that as the occurrence frequency 172a of the anomaly 170 increases, the weight value 176a increases. In another example, the interpreter engine 166 may assign a second weight value 176b to the number of data sources 210 from which the messages 106 (where the anomaly 170 and/or the software application 150 is mentioned) are received (as the metadata 172*b*), where the second weight value 176*b* is proportional to the number of data sources 210 such that as the number of data sources 210 increases, the weight value 176*b* increases. In another example, the interpreter engine 166 may assign a third weight value 176*c* to the timeframe window within which the messages 106 (where the anomaly 170 and/or the software application 150 is mentioned are received (as the metadata 172*c*), where the third weight value 176*c* is proportional to the timeframe window such that as the timeframe window increases, the weight value 176*c* increases. In another example, the interpreter engine 166 may assign a fourth weight value 176*d* to the number of time zones associated with the messages 106 (where the anomaly 170 and/or the software application 150 is mentioned and received (as the metadata 172*d*), where the fourth weight value 176*d* is proportional to the number of time zones such that as the number of time zones increases, the weight value 176*d* increases.

Determining a Countermeasure Action to Address the Detected Anomaly

The interpreter engine 166 may determine the accumulated weight value 176 by combining the set of weight values 176*a* to 176*d*. For example, the interpreter engine 166 may determine the sum of the set of weight values 176*a* to 176*d*. The interpreter engine 166 may compare the accumulated weight values 176 with a threshold weight value 178. The interpreter engine 166 may determine whether the accumulated weight value 176 is more than the threshold weight value 178. If it is determined that the accumulated weight value 176 is more than the threshold weight value 178, the interpreter engine 166 may determine that the determined anomaly 170 has a high priority and needs to be addressed and resolved. In response, the interpreter engine 166 may determine a countermeasure action 174 that addresses (and resolves) the anomalous topic 168 (e.g., corresponding to and/or associated with the software application 150). In this process, the interpreter engine 166 may access the topic-action database 130. The interpreter engine 166 may search for an entry in the list of topics 168 to find a particular entry that has or corresponds to the determined topic 168 from the input data 152 and the determined anomaly 170, where the particular entry is associated with a respective countermeasure action 174. In response to finding the particular entry, the interpreter engine 166 may determine that the respective countermeasure action 174 indicated in the found entry addresses and resolves the anomalous topic 168 associated with the software application 150.

In certain embodiments, the interpreter engine 166 may receive feedback from an operator on the determined software application 150, anomaly 170, and the countermeasure action 174. The interpreter engine 166 may use the operator feedback as a part of a training dataset to improve the determinations of the software application 150, anomaly 170, and the countermeasure action 174. In certain embodiments, the interpreter engine 166 may update one or more entries in the topic-action database 130 based on the operator's feedback.

The interpreter engine 166 may continuously or periodically (every second, etc.) monitor the input data 152 to identify the correlation between different metadata 172, such as user input 154 from one data source 210 or more than one data source 210, timeframe window when the user input 154 is received, tagging group, etc. The interpreter engine 166 may assign weight values 176 to the metadata 172 and determine accumulated weight value 176 for each topic 168 and/or each software application 150 that is discussed or mentioned in the user input 154. In certain embodiments, the interpreter engine 166 may communicate an alert message 182 that indicates to execute the determined countermeasure action 174. In certain embodiments, the interpreter engine 166 may execute the countermeasure action 174.

In certain embodiments, in response to determining that the accumulated weight value 176 is more than the threshold weight value 178, the anomaly detection device 140 may determine that a custom (e.g., dynamic) text notification 180 may need to be generated and published on one or more platforms (e.g., website, mobile application, etc.) to alert and inform the affected users (who are impacted by the anomalous topic 168 associated with the software application 150) about the anomaly 170 with respect to the software application 150. Thus, the anomaly detection device 140 may notify users who are or will be impacted by the anomaly 170 even before the users attempt to contact the organization about the anomaly 170. For example, the interpreter engine 166 may determine that the anomaly 170 is found to be associated with operations within a particular geographical region. In response, the anomaly detection device 140 may publish notification 180 on platforms (e.g., website, mobile application, etc.) that are operated to load within the particular geographical region. The operation of generating a custom text notification 180 based on the determined anomaly 170 with respect to the software application 150 is described in great detail in FIGS. 3 and 5.

Operational Flow for Generating a Dynamic Text

Figure 3:
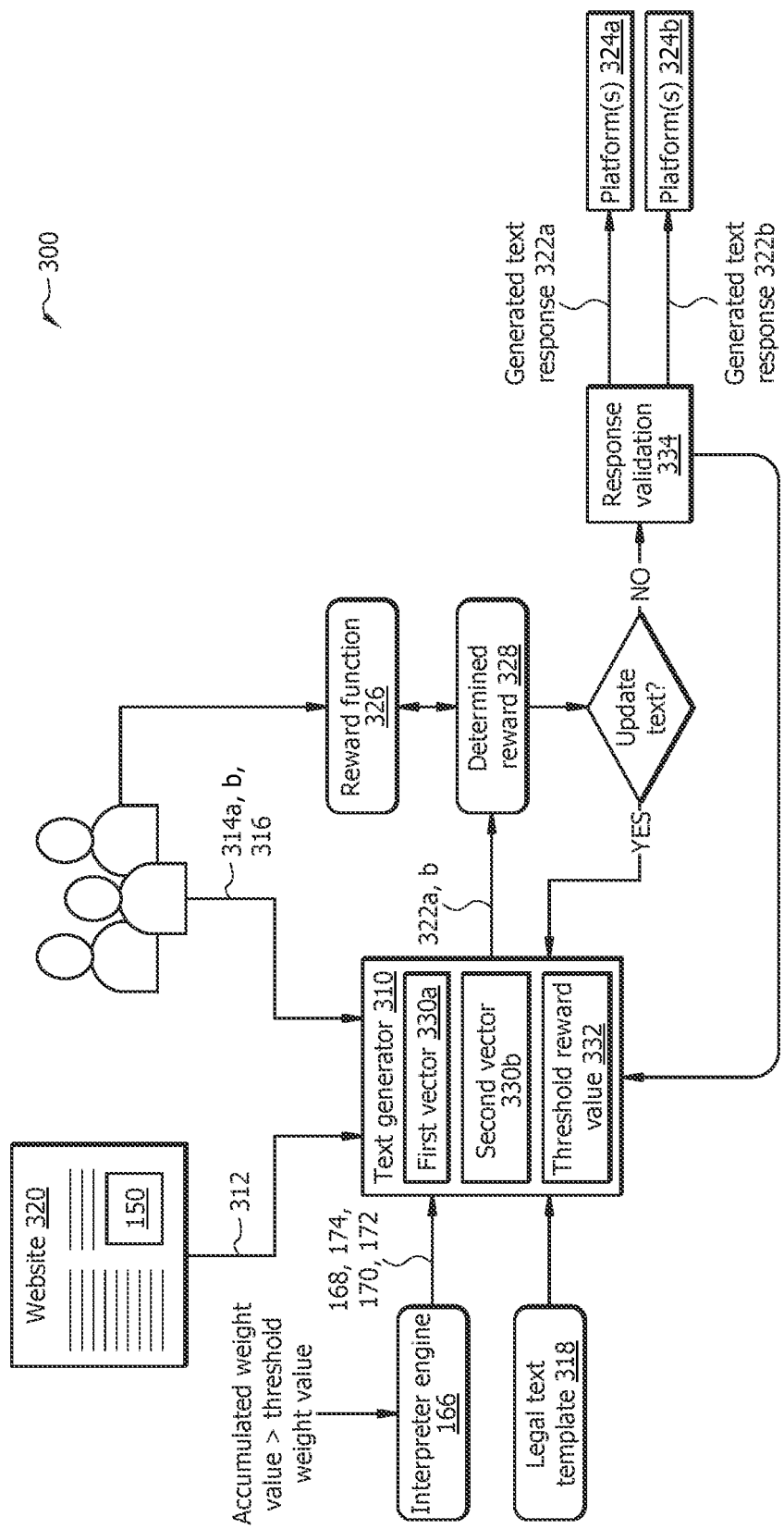
FIG. 3 illustrates an example operational flow of the system of FIG. 1 to generate dynamic responses based on an anomaly associated with a software application.

FIG. 3 illustrates an example operational flow 300 of system 100 (see FIG. 1) for generating one or more dynamic text notifications 180 based on the topic 168 of the user inputs (154 in FIG. 2), and other input data (152 in FIG. 1) according to a set of rules 314*a, b* and based on the content 312, sample text 316, and legal text template 318. The operational flow 300 of the FIG. 3 may be a continuation of the operational flow 200 of FIG. 2.

The operational flow 300 may begin when the interpreter engine 166 communicates the extracted topic 168 (e.g., associated with the software application 150), the determined countermeasure action 174 (that addresses and resolves the anomaly 170 associated with the software application 150), the metadata 172, and the relationship among this information to the text generator 310. The interpreter engine 166 may communicate this information to the text generator 310 if it is determined that the accumulated weight value 176 is more than the threshold weight value 178.

In operation, the text generator 310 may determine the digital content 312 indicated on the website 320. In certain embodiments, the text generator 310 may parse the website 320 by a text parsing code configured to determine the content 312 on the website 320. In certain embodiments, the content 312 may be in form of a text file, a comma-separated values (csv) file, a table, and the like. The digital content 312 comprises the text that is written on a website 320 where the software application 150 (that is determined to be associated with the anomaly 170) is accessible to users. The text generator 310 may use at least a portion of the content 312 to generate the responses 322*a, b*.

The text generator 310 may receive a set of rules 314 (e.g., rules 314*a, b*) that indicates at which platform a given generated response 322*a, b* should be published. The set of rules 314 may include a first rule 314*a* that indicates that a first generated response text 322*a* is to be published on one or more first platforms 324*a*. The one or more first platforms 324*a* may include the website 320, a mobile application where the software application 150 can be accessed, etc. The set of rules 314 may include a second rule 314b that indicates that a second generated response text 322b is to be published on one or more second platforms 324b. The one or more second platforms 324b may include phone communication platforms. For example, the second generated response text 322b may be converted into a corresponding audio file and uttered on an interactive voice response when a user 102 makes a phone call to the organization. In certain embodiments, the second generated response text 322b may be converted into the corresponding audio file by the anomaly detection device (140 in FIG. 1) executing text-to-audio machine learning instructions, a neural network, the text generator 310, and the like.

The text generator 310 may receive sample text 316. The sample text 316 may include sample responses for each software application 150 per anomaly 170, where each sample text 316 is labeled with the corresponding software application 150 and anomaly 170. Each of the sample text 316 may be previously provided by and confirmed by an operator (and/or generated by the text generator 310) according to the set of rules 314 and the legal text templates 318. The sample text 316 may be a part of a training dataset that comprises a set of expected responses for each software application 150 and each anomaly 170. For example, each of the set of expected responses may be labeled with a corresponding software application 150 and the anomaly 170. The text generator 310 may use the training dataset to determine whether a generated text response 322a, b corresponds to an expected response (included in the sample text 316).

The text generator 310 may receive the legal text templates 318. The legal text templates 318 may be provided by a legal team at the organization. The legal text templates 318 may include templates that indicate what information can be included in a given generated response 322a, b and what information cannot or should not be included in a given generated response 322a, b. For example, the legal text templates 318 may indicate a first set of keywords can be included in a response 322a, b and a second set of keywords that should not be included in a response 322a, b.

Generating a First Response Designated for the First Platform(s)

The text generator 310 may use the received input, including the topic 168, countermeasure action 174, anomaly 170, the metadata 172, the digital content 312, the sample text 316, and the legal text template 318 to generate the text response 322a and designates the text response 322a to the one or more first platforms 324a according to the first rule 314a. The text response 322a may indicate that the anomaly 170 associated with the software application 150 is being addressed. Since the text response 322a is designated for the one or more first platforms 324a, the generated text response 322a may include information about the anomaly 170 according to the first rule 314a.

In certain embodiments, the text generator 310 may generate a reward function 326, where the reward function 326 may evaluate whether a generated text 322a, b corresponds to an expected sample text 316 and is according to a respective rule 314a, b, respectively. For example, the text generator 310 may generate the reward function 326 based on the set of rules 314a, b and the sample text 316. The text generator 310 may feed the generated text response 322a to the reward function 326. The text generator 310 (e.g., via the reward function 326) may evaluate the generated text response 322a against the rule 314a and the sample text 316. If it is determined that the generated text response 322a corresponds to an expected response indicated in the sample text 316, the text generator 310 may determine that the generated text response 322a is acceptable. In this process, in certain embodiments, the text generator 310 (e.g., via the reward function 326) may determine a reward value 328 for the generated text response 322a. The reward value 328 may represent a similarity score between the generated response 322a and the sample text 316. For example, the text generator 310 may extract a first set of features from the generated text response 322a, where the first set of features represents the attributes, such as the meaning, interpretation, sentiment, the meaning of each word, and other attributes of the text response 322a. In this process, the text generator 310 may perform word segmentation, sentence segmentation, word tokenization, sentence tokenization, sentiment analysis, and/or the like. The first set of features may be represented by a first vector 330a that comprises numerical values.

The text generator 310 may also extract a second set of features from the sample text 316. The second set of features may be represented by a second vector 330b that comprises numerical values. The second set of features represents the attributes, such as the meaning, interpretation, sentiment, the meaning of each word, and other attributes of the sample text 316. The text generator 310 may compare the first vector 330a with the second vector 330b to determine the reward value 328. In certain embodiments, if more than a threshold number of the first vector 330a corresponds to counterpart numbers in the second vector 330b, the text generator 310 may determine a high reward value 328. The reward value 328 may be proportional to the numbers in the first vector 330a that correspond to the counterpart numbers in the second vector 330b. For example, the reward value 328 proportionally increases as the numbers in the first vector 330a that correspond to the counterpart numbers in the second vector 330b increase.

In certain embodiments, the text generator 310 may determine a Euclidean distance between the first vector 330a and the second vector 330b. The Euclidean distance may be inversely proportional to the reward value 328. The shorter the Euclidean distance is, the more likely the vectors 330a and 330b will be more similar to each other and the reward value 328 may be higher.

The text generator 310 may determine whether the generated text response 322a needs to be updated. To this end, the text generator 310 may compare the determined reward value 328 to a threshold reward value 332. If it is determined that the reward value 328 is more than the threshold reward value 332, the text generator 310 may determine that the generated text response 322a is acceptable and corresponds to the sample text 316. Otherwise, the text generator 310 may determine that the generated text response 322a needs to be updated. If it is determined that the generated text response 322a needs to be updated, the text generator 310 may update the weight and bias values of the neural network and generate another text response 322a. The new generated text response 322a may be evaluated by the reward function 326 and the text generator 310, similar to that described above. This process may be repeated in a loop until it is determined that the generated text response 322a corresponds to an expected response indicated in the sample text 316.

Generating a Second Response Designated for the Second Platform(s)

The text generator 310 may perform a similar operation with respect to the text response 322b that is designated for the one or more second platforms 324b and is generated according to the second rule 314b. For example, the text generator 310 may generate the text response 322b based on the topic 168, countermeasure action 174, anomaly 170, the metadata 172, the digital content 312, the sample text 316, and the legal text template 318 according to the rule 314b. The text generator 310 may designate the text response 322b to the one or more second platforms 324b according to the rule 314b. The generated response 322b may not indicate the anomaly 170 according to the rule 314b. For example, the rule 314b may indicate that the generated text response 322b that is designated for the one or more second platforms 324b should not indicate the anomaly 170. The second generated text response 322b may indicate that a service provided by the software application 150 is currently interrupted (without mentioning the anomaly 170).

The text generator 310 may evaluate the response 322b by the reward function 326, similar to that described above with respect to evaluating the response 322a. For example, the text generator 310 (e.g., via the reward function 326) may evaluate the generated text response 322b against the rule 314b and a sample text 316. If it is determined that the generated text response 322b corresponds to an expected response indicated in a sample text 316, the text generator 310 may determine that the generated text response 322b is acceptable. In this process, in certain embodiments, the text generator 310 (e.g., via the reward function 326) may determine a reward value 328 for the generated text response 322b. The reward value 328 may represent a similarity score between the generated response 322b and the sample text 316.

The text generator 310 may compare the generated response 322b and the sample text 316, similar to that described above, e.g., by extracting features from each of them, generating the vectors 330a and 330b, comparing the vectors 330a and 330b, and determining whether they correspond to each other based on the number of numerical values in the vector 330a that correspond to their counterpart numerical values in the vector 330b and/or the Euclidean distance between the vectors 330a and 330b. If the text generator 310 determines that the reward value 328 for the generated response 322b is more than the threshold reward value 332, the text generator 310 may determine that the generated response 322b is acceptable and corresponds to a sample text 316. Otherwise, the text generator 310 may determine that the generated response 322b needs to be updated. In this process, the text generator 310 may update the weight and bias values of the neural network and generate a new response 322b. The newly generated text response 322b may be evaluated by the reward function 326 and the text generator 310, similar to that described above. This process may be repeated in a loop until it is determined that the generated text response 322b corresponds to an expected response indicated in the sample text 316.

Validating a Generated Response Based on Feedback from an Operator

In response to determining that the response 322a, b does not need to be updated, in certain embodiments, the text generator 310 may present the generated response 322a, b to an operator. In response validation 334, the operator may provide feedback on the response 322a, b. The operator may confirm, update, or override the generated response 322a, b. The feedback of the operator may be fed back to the text generator 310 as a part of a training dataset to further improve the determination of the text generator 310 in generating the response 322a, b.

In certain embodiments, if the confidence score of text generator 310 in generating the response 322a, b increases more than a threshold confidence score (e.g., 80%, 90%, etc.), the response validation 334 by the operator may be eliminated. Upon finalizing the generated text response 322a, b, each generated response 322a, b is forwarded to appropriate computing devices and/or agents to publish the responses 322a, b on each respective platform 324a, b, respectively.

Method for Anomaly Detection from Network Traffic

Figure 4:
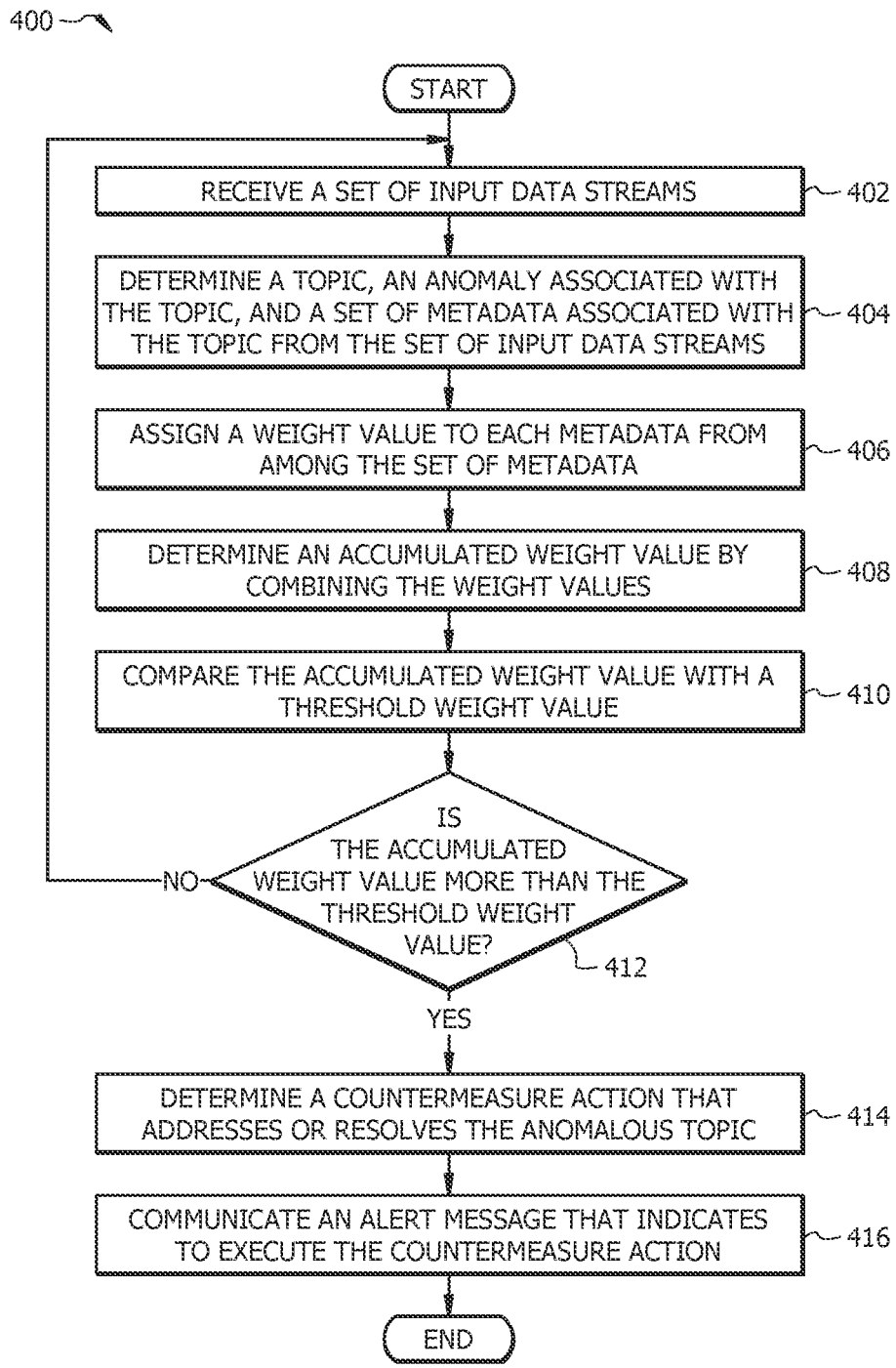
FIG. 4 illustrates an example flowchart of a method to detect anomalies from network traffic.

FIG. 4 illustrates an example flowchart of a method 400 for anomaly detection from network traffic according to certain embodiments of the present disclosure. Modifications, additions, or omissions may be made to method 400. Method 400 may include more, fewer, or other operations. For example, operations may be performed in parallel or in any suitable order. While at times discussed as the system 100, anomaly detection device 140, or components of any of thereof performing operations, any suitable system or components of the system may perform one or more operations of the method 400. For example, one or more operations of method 400 may be implemented, at least in part, in the form of software instructions 148 of FIG. 1, stored on non-transitory, tangible, machine-readable media (e.g., memory 146 of FIG. 1) that when run by one or more processors (e.g., processor 142 of FIG. 1) may cause the one or more processors to perform operations 402-416.

At operation 402, the anomaly detection device 140 receives a set of input data streams. For example, the anomaly detection device 140 may receive the set of input data 152 from multiple data sources 210a-d, similar to that described in FIG. 2.

At operation 404, the anomaly detection device 140 determines a topic 168, anomaly 170 associated with the topic 168, and a set of metadata 172 associated with the topic 168. The topic 168 of the user input 154 may include and/or be associated with a software application 150 that the users 102 may have difficulty accessing or operating, where the software application 150 may be provided to the users 102 on one or more platforms, such as the website 320, a mobile application, and the like, similar to that described in FIG. 2.

At operation 406, the anomaly detection device 140 assigns a weight value 176 to each metadata 172 from among the set of metadata 172. Examples of assigning weight values 176 to the set of metadata 172 are described in FIG. 2. Each weight value 176 may represent a priority of the respective metadata 172.

At operation 408, the anomaly detection device 140 determines an accumulated weight value 176 by combining the weight values 176. The accumulated weight value 176 may represent how critical or urgent it is to address the anomaly 170 with respect to the topic 168. If the accumulated weight value 176 is less than the threshold weight value 178, it may be determined that the anomaly 170 is not critical or urgent. Otherwise, it may be determined that the anomaly 170 is critical and urgent and needs to be addressed and/or resolved.

At operation 410, the anomaly detection device 140 compares the accumulated weight value 176 with a threshold weight value 178. The threshold weight value 178 may be any suitable value, including one, ten, fifty, etc. The threshold weight value 178 may be preconfigured by a user or the anomaly detection device 140 based on the performance of the anomaly detection device 140.

At operation 412, the anomaly detection device 140 determines whether the accumulated weight value 176 is more than the threshold weight value 178. If it is determined that the accumulated weight value 176 is more than the threshold weight value 178, the method 400 may proceed to the operation 414. Otherwise, method 400 may return to operation 402.

At operation 414, the anomaly detection device 140 determines a countermeasure action 174 that addresses or resolves the anomalous topic 168 (e.g., the software application 150). For example, the anomaly detection device 140 may determine the countermeasure action 174 by searching in the topic-action database 130 to find an entry with the corresponding topic 168 and anomaly 170, similar to that described in FIG. 2.

At operation 416, the anomaly detection device 140 communicates an alert message 182 that indicates to execute the countermeasure action 174. For example, the anomaly detection device 140 may communicate the alert message 182 to an operator. In the same or another example, the anomaly detection device 140 may present the countermeasure action 174 on a display screen of the anomaly detection device 140 for the operator to view. The operator may update, confirm, or override the countermeasure action 172, and execute the finalized countermeasure action 172. In certain embodiments, the anomaly detection device 140 may receive feedback from the operator and use it for future determination of the countermeasure actions 172. In certain embodiments, the anomaly detection device 140 may execute the countermeasure action 172 after the training phase is complete and the accuracy of the anomaly detection device 140 is increased over a threshold percentage (e.g., 80%, 90%, etc.).

Method for Dynamic Response Generation Based on an Anomaly Score of an Input

Figure 5:
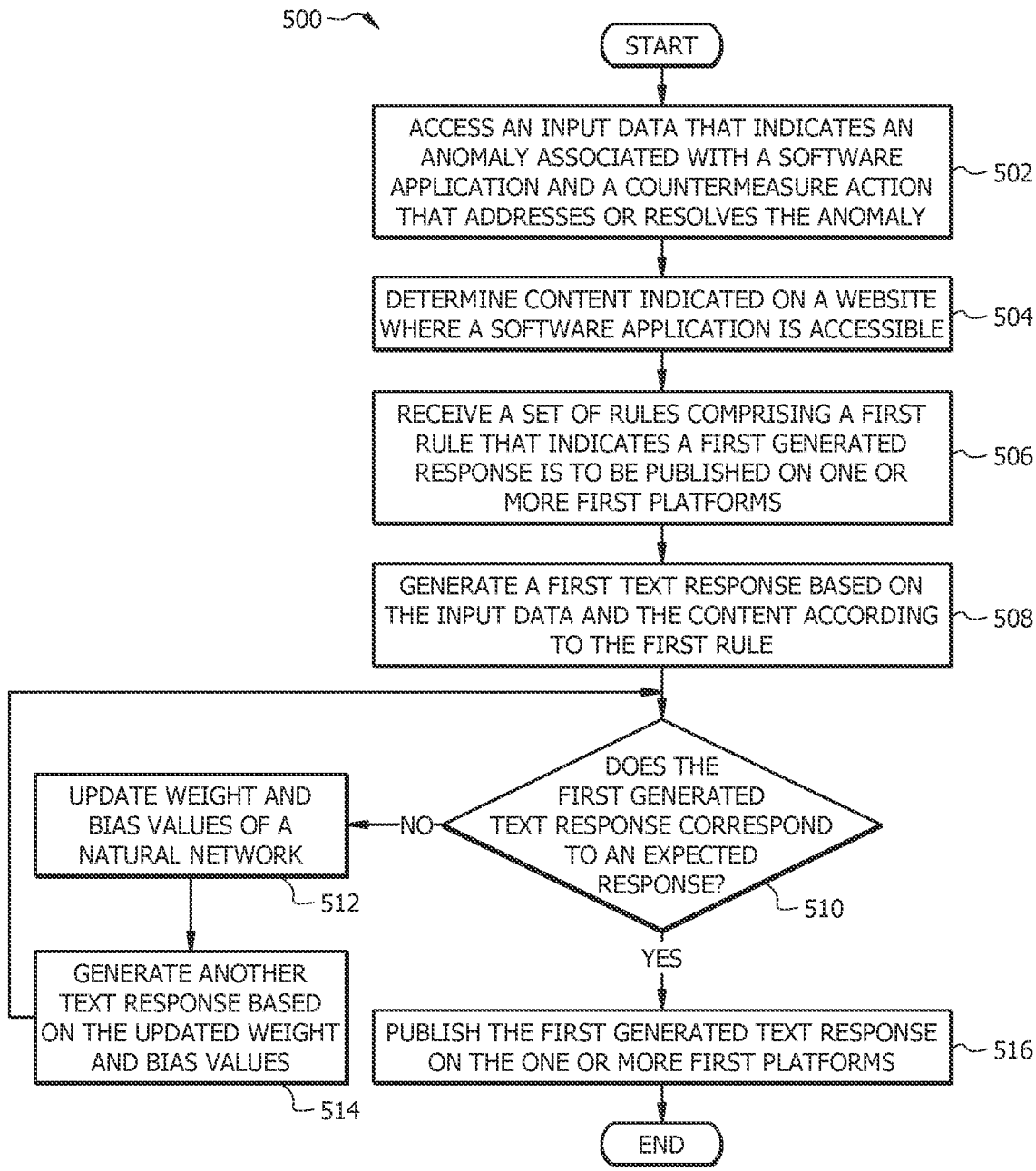
FIG. 5 illustrates an example flowchart of a method to generate dynamic responses based on an anomaly associated with a software application.

FIG. 5 illustrates an example flowchart of a method 500 for dynamic response 322a, b generation based on an anomaly score of an input according to certain embodiments of the present disclosure. Modifications, additions, or omissions may be made to method 500. Method 500 may include more, fewer, or other operations. For example, operations may be performed in parallel or in any suitable order. While at times discussed as the system 100, anomaly detection device 140, or components of any of thereof performing operations, any suitable system or components of the system may perform one or more operations of the method 500. For example, one or more operations of method 500 may be implemented, at least in part, in the form of software instructions 148 of FIG. 1, stored on non-transitory, tangible, machine-readable media (e.g., memory 146 of FIG. 1) that when run by one or more processors (e.g., processor 142 of FIG. 1) may cause the one or more processors to perform operations 502-516.

At operation 502, the anomaly detection device 140 accesses an input data that indicates an anomaly 170 associated with a software application 150 and a countermeasure action 174 that addresses or resolves the anomaly 170. For example, the anomaly detection device 140 (at the text generator 310) may receive the output from the interpreter engine 166, similar to that described in FIG. 3.

At operation 504, the anomaly detection device 140 determines the content 312 indicated on the website 320 where the software application 150 is accessible. For example, the anomaly detection device 140 may parse the website 320 to extract the text written on the website 320. In another example, the anomaly detection device 140 may be provided with the content 312 in a document by an operator.

At operation 506, the anomaly detection device 140 receives a set of rules 314a, b comprising a first rule 314a that indicates a first generated response 322a is to be published on one or more first platforms 324a. For example, the anomaly detection device 140 may be provided with the set of rules 314a, b by an operator.

At operation 508, the anomaly detection device 140 generates a first text response 322a based on the input data (received from the interpreter engine 166) and the content 312 according to the first rule 314a. In certain embodiments, the anomaly detection device 140 may also receive the legal text template 318 and sample text 316 in addition to the output from the interpreter engine 166 and the content 312. The anomaly detection device 140 may use the received inputs to generate the first text response 322a, similar to that described in FIG. 3.

At operation 510, the anomaly detection device 140 determines whether the first generated text response 322a corresponds to an expected response indicated in the sample text 316. If it is determined that the first generated text response 322a corresponds to the expected response, the method 500 proceeds to operation 516. Otherwise, method 500 proceeds to operation 512.

At operation 512, the anomaly detection device 140 updates the weight and bias values of a neural network. In this operation, the anomaly detection device 140 may update the weight and bias values of the neural network implemented by the processor 142 and included in the text generator 310.

At operation 514, the anomaly detection device 140 generates another text response 322a based on the updated weight and bias values. For example, the anomaly detection device 140 may generate another text response 322a and/or update the first response message 322a. In response, the method 500 may return to the operation 510 where the generated response 322a is evaluated again against the expected responses in the sample text 316. The anomaly detection device 140 may perform this loop until it is determined that the generated text response 322a corresponds to an expected response indicated in the sample text 316.

At operation 516, the anomaly detection device 140 publishes the first generated text response 322a on the one or more first platforms 324a. In certain embodiments, the anomaly detection device 140 may communicate the generated text response 322a to one or more software applications (e.g., conversational computing agents, etc.) that are configured to publish the generated text response 322a on the one or more first platforms 324a.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system for generating a dynamic response based on an anomaly associated with a software application, comprising:
a memory configured to store:
a text message indicating an anomaly associated with a software application and a countermeasure action that addresses or resolves the anomaly; and
a training dataset that comprises an expected response labeled with the software application;
a processor operably coupled to the memory, and configured to:
determine content indicated on a website where the software application is accessible, wherein the content comprises text written on the website;
receive a set of rules comprising a first rule that indicates a first generated response is to be published on one or more first platforms, wherein the one or more first platforms comprises at least one of the website or a mobile application where the software application is accessed;
based at least in part upon the text message and the determined content, generate a first text response according to the first rule, wherein the first text response indicates that the anomaly associated with the software application is being addressed;
determine whether the first generated text response corresponds to the expected response; and
in response to determining that the first generated text response corresponds to the expected response, publish the first generated text response on the one or more first platforms.

2. The system of claim 1, wherein the set of rules further comprises a second rule that indicates that a second generated response is to be published on a second platform.

3. The system of claim 2, wherein the processor is further configured to:
based at least in part upon the text message and the determined content, generate a second response according to the second rule, wherein the second generated text response indicates that a service provided by the software application is currently interrupted; and
publish the second generated text response on the second platform.

4. The system of claim 2, wherein the second rule further indicates that the second generated text response should not indicate the anomaly.

5. The system of claim 1, wherein the processor is further configured to:
in response to determining that the first generated text response does not correspond to the expected response:
update weight and bias values of a neural network implemented by the processor; and
update the first text response based at least in part upon the updated weight and the updated bias values of the neural network.

6. The system of claim 1, wherein:
before the first text response is generated, the processor is further configured to receive a legal text template that indicates information that can be included in the first generated response and information that cannot be included in the first generated response; and
the first generated response is generated further based at least in part upon the legal text template.

7. The system of claim 1, wherein at least a portion of the text written on the website is used to generate the first generated response.

8. A method for generating a dynamic response based on an anomaly associated with a software application, comprising:
storing a text message indicating an anomaly associated with a software application and a countermeasure action that addresses or resolves the anomaly;
storing a training dataset that comprises an expected response labeled with the software application;
determining content indicated on a website where the software application is accessible, wherein the content comprises text written on the website;
receiving a set of rules comprising a first rule that indicates a first generated response is to be published on one or more first platforms, wherein the one or more first platforms comprises at least one of the website or a mobile application where the software application is accessed;
based at least in part upon the text message and the determined content, generating a first text response according to the first rule, wherein the first text response indicates that the anomaly associated with the software application is being addressed;
determining whether the first generated text response corresponds to the expected response; and
in response to determining that the first generated text response corresponds to the expected response, publishing the first generated text response on the one or more first platforms.

9. The method of claim 8, wherein the set of rules further comprises a second rule that indicates that a second generated response is to be published on a second platform.

10. The method of claim 9, further comprising:
based at least in part upon the text message and the determined content, generating a second response according to the second rule, wherein the second generated text response indicates that a service provided by the software application is currently interrupted; and
publishing the second generated text response on the second platform.

11. The method of claim 9, wherein the second rule further indicates that the second generated text response should not indicate the anomaly.

12. The method of claim 8, further comprising:
in response to determining that the first generated text response does not correspond to the expected response:
updating weight and bias values of a neural network implemented by a processor; and
updating the first text response based at least in part upon the updated weight and the updated bias values of the neural network.

13. The method of claim 8, wherein:
before the first text response is generated, the method further comprises receiving a legal text template that indicates information that can be included in the first generated response and information that cannot be included in the first generated response; and the first generated response is generated further based at least in part upon the legal text template.

14. The method of claim 8, wherein at least a portion of the text written on the website is used to generate the first generated response.

15. A non-transitory computer-readable medium storing instructions that when executed by a processor, cause the processor to:
- store a text message indicating an anomaly associated with a software application and a countermeasure action that addresses or resolves the anomaly;
- store a training dataset that comprises an expected response labeled with the software application;
- determine content indicated on a website where the software application is accessible, wherein the content comprises text written on the website;
- receive a set of rules comprising a first rule that indicates a first generated response is to be published on one or more first platforms, wherein the one or more first platforms comprises at least one of the website or a mobile application where the software application is accessed;
- based at least in part upon the text message and the determined content, generate a first text response according to the first rule, wherein the first text response indicates that the anomaly associated with the software application is being addressed;
- determine whether the first generated text response corresponds to the expected response; and
- in response to determining that the first generated text response corresponds to the expected response, publish the first generated text response on the one or more first platforms.

16. The non-transitory computer-readable medium of claim 15, wherein the set of rules further comprises a second rule that indicates that a second generated response is to be published on a second platform.

17. The non-transitory computer-readable medium of claim 16, wherein the instructions further cause the processor to:
- based at least in part upon the text message and the determined content, generate a second response according to the second rule, wherein the second generated text response indicates that a service provided by the software application is currently interrupted; and
- publish the second generated text response on the second platform.

18. The non-transitory computer-readable medium of claim 16, wherein the second rule further indicates that the second generated text response should not indicate the anomaly.

19. The non-transitory computer-readable medium of claim 15, wherein the instructions further cause the processor to:
- in response to determining that the first generated text response does not correspond to the expected response:
  - update weight and bias values of a neural network implemented by the processor; and
  - update the first text response based at least in part upon the updated weight and the updated bias values of the neural network.

20. The non-transitory computer-readable medium of claim 15, wherein determining the content indicated on the website associated with the software application is in response to parsing the website to extract the text.

* * * * *